United States Patent [19]

Miller

[11] Patent Number: 4,837,001

[45] Date of Patent: * Jun. 6, 1989

[54] PRODUCTION OF SULFUR FROM SULFUR DIOXIDE OBTAINED FROM FLUE GAS

[75] Inventor: Ralph Miller, Pleasantville, N.Y.

[73] Assignee: T-Thermal, Inc., Conshohocken, Pa.

[*] Notice: The portion of the term of this patent subsequent to May 13, 2003 has been disclaimed.

[21] Appl. No.: 19,877

[22] Filed: Feb. 27, 1987

Related U.S. Application Data

[63] Continuation-in-part of Ser. No. 835,359, Mar. 3, 1986, abandoned, which is a continuation-in-part of Ser. No. 695,634, Jan. 28, 1985, Pat. No. 4,588,567.

[51] Int. Cl.$^4$ .................. B01D 53/02; C01B 17/04; C01B 17/26; C01D 7/00
[52] U.S. Cl. .................. 423/574 R; 423/242; 423/422; 423/563
[58] Field of Search .................. 423/574 R, 563, 422, 423/242 A

[56] References Cited

U.S. PATENT DOCUMENTS

| | | | |
|---|---|---|---|
| 690,502 | 1/1902 | Wing | 423/563 |
| 3,932,587 | 1/1976 | Grantham et al. | 423/563 |
| 3,991,162 | 11/1976 | Taylor | 423/242 A |
| 4,107,015 | 8/1978 | Chlanda et al. | 423/539 |
| 4,241,041 | 12/1980 | Farin | 423/563 |
| 4,588,567 | 5/1986 | Miller | 423/563 |

Primary Examiner—John Doll
Assistant Examiner—Jeffrey Edwin Russel
Attorney, Agent, or Firm—Ferrill and Logan

[57] ABSTRACT

This invention is a regenerable process for producing elemental sulfur from $SO_2$ initially contained in a dilute gas source by: (1) absorbing the $SO_2$ in a concentrated $Na_2SO_3$ solution to convert most of the $Na_2SO_3$ to $Na_2S_2O_5$; (2) separating one third of the absorbed $SO_2$; (3) reacting the residual mixture with solid $NaHCO_3$ to form gaseous carbon dioxide used in a subsequent step and a slurry composed of solid $Na_2SO_3$ suspended in a $Na_2SO_3$ solution; (4) separating solid $Na_2SO_3$ from the solution which is recycled to (1) above; (5) reducing solid $Na_2SO_3$ to $Na_2S$; (6) reacting the $Na_2S$ with $H_2O$ and $CO_2$ to form solid $NaHCO_3$ which is recycled to (3) above and gaseous $H_2S$; (6) reacting gaseous $H_2S$ with $SO_2$ separated in (2) above to form water and elemental sulfur.

8 Claims, 2 Drawing Sheets

PRODUCTION OF SULFUR FROM SULFUR DIOXIDE OBTAINED FROM FLUE GAS

This application is a continuation-in-part of my co-pending application, Ser. No. 835,359, filed Mar. 3, 1986, now abandoned, which is a continuation-in-part of application Ser. No. 695,634, filed Jan. 28, 1985, and issued as U.S. Pat. No. 4,588,567 on May 13, 1986.

BACKGROUND OF THE INVENTION

This invention is concerned with the economic conversion to elemental sulfur of sulfur dioxide initially contained in a gas mixture in which the $SO_2$ was a minor component. Although this invention is useful in a variety of circumstances, for example, in processing $SO_2$ contained in a gas mixture emanating from the roasting of sulfide ores, it is of especial utility in flue gas desulfurization (FGD).

It has long been known that when present in the atmosphere even in small concentrations, suflur dioxide is detrimental to the well-being of animal, aquatic and plant life, When converted to sulfuric acid by the oxygen and moisture in the air, which conversion takes place readily, sulfur dioxide is responsible for the corrosion of many materials of construction including steel and concrete.

Putting large amounts of $SO_2$ into the air from fuel burning installations was prohibited in 1967. In that year Congress passed the Clean Air Act and amended it in 1970. As a result of this legislation the Environmental Protection Agency (EPA) has established standards which limits the emission of the principal pollutants contained in flue gas. These pollutants are particulates, sulfur dioxide and nitrogen oxides measured as nitrogen dioxide. Some of these standards are shown in Table 1.

TABLE 1

Standards of Performance for New Fossil-Fired Steam Generators (Construction Commenced After August 17, 1971)
Fuel Type-Maximum Quantity of Pollutants Permitted in Flue-Gas

| | Pounds/Million BTU | | |
|---|---|---|---|
| | Particulates | Sulfur Oxides | Nitrogen Oxides |
| Solid | .10 | 1.2 | .70 |
| Liquid | .10 | .8 | .30 |
| Gas | — | — | .20 |

The bulk of our heavy duty fuels i.e. butiminous coal and residual fuel oil contain appreciable percentages of sulfur—many containing more than 3% by weight. From the above figures it is evident that when 12,000 BTU per pound coal containing 0.8% sulfur is burned, the limits set by the EPA will be exceeded. To operate within EPA limits, installations burning large tonnages of economically priced fuel have had to resort to scrubbers to remove a large part of the $SO_2$ contained in the flue gas leaving their combustion zones. Most of these scrubbers use lime or limtestone directly or indirectly to combine with the $SO_2$ scrubbed out of the flue gas. The chief virtue of this practice is that the pollutant formed, a sludge composed mainly of calcium sulfite and calcium sulfate, is less objectionable than $SO_2$ in air. These sludges are being impounded except where local circumstances allow them to be used as land-fill. When $SO_2$ is scrubbed out of flue gas by a calcium compound, the resulting substance usually becomes a waste disposal problem. Disposing of this waste is a continuing source of expense in addition to the cost of the calcium compound consumed in the operation.

BACKGROUND OF THE PRIOR ART

Since the promulgation by the EPA of the above standards, a large number of flue gas desulfurization processes have been described and an appreciable number of those described previously put into commercial practice. Of those described previously that described in U.S. Pat. No. 4,141,961 and more especially that described in my application Ser. No. 695,634 filed Jan. 28, 1985, issued as U.S. Pat. No. 4,588,567, on May 13, 1986, are closest to the process which constitutes this invention.

Many of the absorbents used to scrub $SO_2$ out of the flue gas form slightly soluble compounds. As a result the equipment used to effect the contact between gas and absorbent frequently becomes covered wih scale. The scale formed causes operational difficulties necessitating shut downs and the incurring of excessive maintenance costs.

Although the process described in U.S. Pat. No. 4,141,961 is technically feasible, it has been found that it contains a variety of drawbacks which is less attractive than is desirable. The process described in application Ser. No. 695,634 now U.S. Pat. No. 4,588,567 employs fundamentally different process concepts than that of U.S. Pat. No. 4,141,961 although both had the same fundamental objective—i.e. the recovery of hydrogen sulfide as a major component of a gas mixture. By contrast, the objective of the present invention is the recovery of elemental suflur. As will be explained below, the present invention appears to be somewhat more complex than the processes described in the above-cited patents.

It is to be emphasized that flue gas desulfurization is practiced in order to comply with government regulations. The cost of performing this operation will always exceed the value of the product produced whether the product is elemental suflur, wall board quality gypsum, ammonium sulfate or other sulfur-containing product. Because this operation is a source of expense rather than revenue, even small economies are diligently sought. The present invention makes possible very substantial savings compared with other regenerable processes.

Like all other chemical processes, the cost of practicing this invention consists of the capital expense and operating expense. Under most conditions the capital expense will exceed that of the operating expense. Both are obviously important. A fundamental objective of this invention is the reduction of both capital expense and operating expense when these cost items are compared with similar items of previous regenerable flue gas desulfurization processes.

It is a further object of this invention to use an aqueous $SO_2$ absorbent of low viscosity with a high $SO_2$ absorbent capacity which is capable of being completely regenerated to a relatively high pH.

An important object of this invention is to employ a system free from slightly soluble substances to prevent scaling problems.

An additional object of this invention is to recover gaseous $SO_2$ and gaseous $H_2$ in molecular proportions of substantially one (1) to two (2) in the presence of minimum amounts of fixed gases such as nitrogen and reactive gases such as carbon dioxide so that they can be economically reacted to form elemental sulfur and water.

Further useful objectives and desirable attributes of the invention are attained by employing a series of chemical reactions in a novel sequence.

SUMMARY OF THE INVENTION

The principal reactions which are employed in this invention are:

| A-1 | $Na_2SO_3 + SO_2 =$ | $Na_2S_2O_5$ |
| --- | --- | --- |
|  | or |  |
| A-2 | $Na_2SO_3 + SO_2 + H_2O =$ | $2NaHSO_3$ |
| B-1 | $Na_2S_2O_5 =$ | $SO_2 + Na_2SO_3$ |
|  | or |  |
| B-2 | $2NaHSO_3 =$ | $H_2O + Na_2SO_3 + SO_2$ |
| B-3 | $NaHSO_3 + H^+ =$ | $H_2O + SO_2 + Na^+$ |
| B-4 | $NaHSO_3 + Na^+ + OH^- =$ | $Na_2SO_3 + H_2O$ |
| B-5 | $Na_2SO_3 + H^+ =$ | $NaHSO_3 + Na^+$ |
| C | $Na_2S_2O_5 + 2NaHCO_3 =$ | $2CO_2 + H_2O + 2Na_2SO_3$ |
| D | $Na_2SO_3 + 3C =$ | $3CO + Na_2S$ |
| E | $CO + \frac{1}{2}O_2 =$ | $CO_2$ |
| F | $Na_2S + 2H_2O + 2CO_2 =$ | $H_2S + 2NaHCO_3$ |
| G | $H_2S + Na_2S =$ | $2NaHS$ |
| H | $SO_2 + 2H_2S =$ | $3S + 2H_2O$ |
| I | $H_2O + $ direct electric current | $H^+ + OH^-$ |

Reaction A is employed in the $SO_2$ absorption step. The absorbent is a substantially saturated solution of $Na_2SO_3$. Although the reaction between $NA_2SO_3$ and $SO_2$ is preferably written as shown in Reaction A, it can also be written:

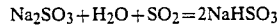

$$Na_2SO_3 + H_2O + SO_2 = 2NaHSO_3$$

Reaction B-1 is the reverse of Reaction A-1. It takes place by evaporating the solution to vaporize water and $SO_2$. Although a relatively large amount of water must be vaporized per unit weight of $SO_2$ vaporized, it may be regarded as:

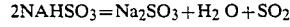

$$2NAHSO_3 = Na_2SO_3 + H_2O + SO_2$$

The vapor pressure of the $SO_2$ varies with temperature and the mole ratio of $Na_2SO_3$ to $Na_2S_2O_5$ in the solution. The higher the mole ratio of $Na_2SO_3$ to $Na_2S_2O_5$ in the solution, the lower the $SO_2$ partial pressure and the greater the amount of water than must be vaporized per unit weight of $SO_2$ vaporized.

Reaction C regenerates $Na_2SO_3$ as well as forms gaseous $CO_2$ used in Reactin F.

By carrying out Reaction C in the manner to be described, solids $Na_2SO_3$ precipitates from solution. It is separated by any convenient liquids—solids separation method. The solids $Na_2SO_3$ is reduced as shown in Reaction D to $Na_2S$. As written, this is an over-simplified description of what takes place.

When $Na_2SO_3$ is reduced with a carbonaceous reducing agent, a mixture of CO and $CO_2$ is formed. Part or all of the CO is burned as shown in Reaction E in the equipment used to carry out the reduction step. The heat evolved is used to bring the temperature of the reactant mixture to a temperature above about 700° C.

Reaction F shows the formation of gaseous $H_2S$ and $NaHCO_3$ from the $Na_2S$ obtained in the reduction step and $CO_2$ evolved in the $Na_2SO_3$ precipitation step.

Reaction G showing the absorption of $H_2S$ by a solution of $Na_2S$ can be used as a supplement to the sulfur formation step. It can be used to remove small amounts of $H_2S$ from gas before it is vented to the atmosphere.

The formation of sulfur from gaseous $SO_2$ and gaseous $H_2$ shown in Reaction H goes as written over an alumina catalyst. At elevated temperatures this is an equilibrium reaction. By a series of cooling and condensation step, the reaction can go to about 96% completion. It is planned to employ a slight excess of $H_2S$ so that the gas leaving the last condenser in the reaction train will consist of water vapor and $H_2S$. The gas will be cooled to condense most of the water. The exit gas consisting primarily of $H_2S$ is recycled to the inlet of the sulfur formation reactor.

Inevitably, a small amount of $N_2$ will enter the system. It is purged by taking a side stream of the recycled $H_2S$ that is fed to a small absorption column in which the $H_2S$ is absorbed in a solution of $Na_2S$ as shown in Reaction G. The NaHS solution becomes part of the feed to the carbonation step.

Reaction 1 depicts the splitting of water hydrogen ions and hydroxyl ions.

Reaction B-2 shows the reaction between $NaHSO_3$ and $H+$ and the influence of the direct electric current to form $H_2SO_5$ and $H_2O + SO_2$ and sodium ions.

Reaction B-3 show the regeneration of $Na_2SO_3$ as a result of a reaction between $NaHSO_3$, hydroxyl ion and sodium ion.

Reaction B-5 is similar to reaction B-3 except that the hydrogen ion reacts with $Na_2SO_3$ to form $NaHSO_3$ and sodium ion. This reaction is undesirable but it is minimized by methods desribed below.

DETAILED DESCRIPTION

Figure 1:
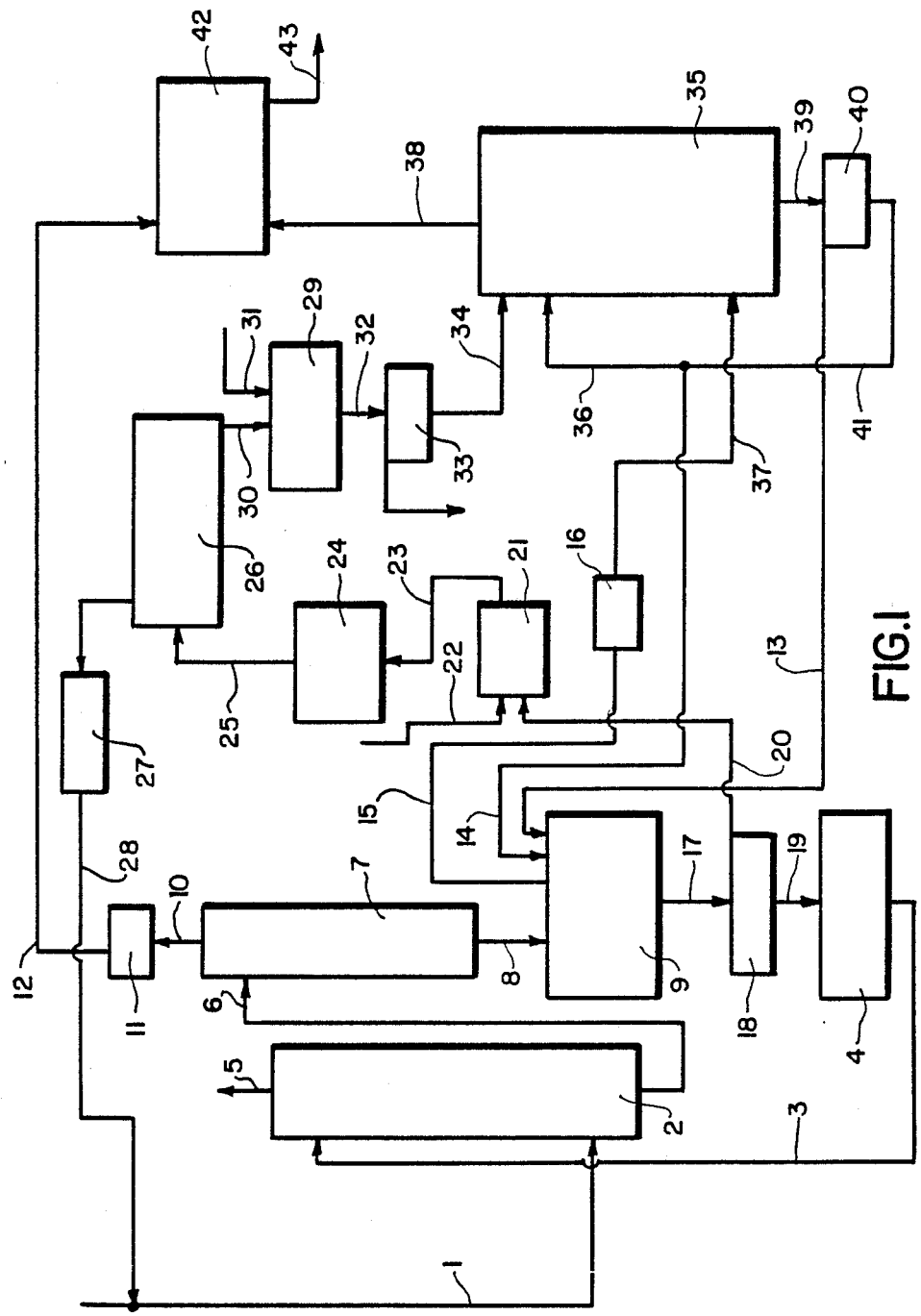
FIG. 1 is a flow diagram of one variation of the process which constitutes this invention. The drawings combined with the information in the detailed description shows how each step of the process is related to one or more of the other process steps. In this version one-third of the absorbed $SO_2$ is desorbed by heating the solution leaving the $SO_2$ absorber. Simultaneously an equivalent amount of $NA_2SO_3$ is formed. This is reaction B-1 or B-2.

One embodiment of the invention will be understood by studying the flow diagram in FIG. 1 starting with the sulfur dioxide as it enters the process and leaves as elemental sulfur. It is convenient to show the application of the invention to flue gas leaving the economizer of a large power plant burning high ash, high sulfur, low cost bituminous coal. The hot $SO_2$- containing flue gas with its particulates largely removed passes through a prescrubber or quencher, not shown, in the form of a venturi scrubber. This cools the gas to a temperature within the approximate range 45°–55° C. and substantially saturates it with water vapor. Trace quantities of HCl and some of the remaining particulates in the gas are removed.

The cool gas flowing through duct (1) from the prescrubber enters absorption tower (2). The gas passes upward through the tower counter-current to a downward flowing absorbent liquid which enters the tower through a top liquid inlet. The absorbent liquid entering the tower is a substantially saturated Na$_2$SO$_3$ solution. The tower is equipped with liquid-gas contacting means. The tower may be a spray tower fitted with a series of spray nozzles at several elevations in the tower, or trays or grid contact surfaces or any other suitable gas-liquid contact means. The Na$_2$SO$_3$ solution enters tower (2) by means of piping (3) connected to absorption tower feed tank (4).

As the gas flows upward counter-current to the downward flowing SO$_2$ absorbent, SO$_2$ passes from the gas phase into the solution. It convenient to have the incoming Na$_2$SO$_3$ solution contain about 330 parts of Na$_2$SO$_3$ dissolved in 1,000 parts of water. Na$_2$SO$_3$ has its maximum solubility in water at a temperature close to 35° C. Its solubility decreases as the temperature of the solution varies from this level. Above 35° C., the anhydrous salt is in equilibrium with the solution; below 35° C., the hydrated salt forms. As the solution flows downward and absorbs SO$_2$, an increasing percentage of the dissolved Na$_2$SO$_3$ is converted to Na$_2$S$_2$O$_5$. Na$_2$S$_2$O$_5$ is much more soluble in water than Na$_2$SO$_3$. In a typical instance the solution described above can dissolve about 114 parts of SO$_2$ without any solid coming out of solution. If 70% of the Na$_2$SO$_3$ is converted to Na$_2$S$_2$O$_5$, the solution will still have a pH above 5. The pH of a concentrated Na$_2$SO$_3$ solution is close to 10.

The gas substantially denuded of SO$_2$ leaves tower (2) through outlet duct (5). In many instances the gas is heated by means not shown to increase its buoyancy to avoid troublesome plumes. The rich or pregnant solution leaves the tower through its bottom liquid outlet and flows through piping (6) to the partial SO$_2$ desorption step. The desorber is a crystallizer-evaporator installation (7) which is heated by low pressure steam. In the crystallizer-evaporator the solution is heated to drive off water and SO$_2$. Substantially one-third of the SO$_2$ that has been absorbed is stripped out of the solution along with water. To save steam, the evaporator may be a multiple-effect unit. The number of effects used depends upon the relative costs of capital and fuel. Another means for separating SO$_2$ from the solution formed in the absorber is to employ a vapor recompression evaporator-crystallizer. Vapor recompression largely avoids the loss of the latent heat of the water vapor which is vaporized along with the vaporized SO$_2$. A slurry is formed in the crystallizer-evaporator. It leaves the crystallizer-evaporator by means of piping (8) and flows into Na$_2$SO$_3$ precipitator (9). As can be seen from Reaction B-1, when SO$_2$ is vaporized, an equal molar amount of Na$_2$S$_2$O$_5$ is converted to Na$_2$SO$_3$.

The vapor formed in the crystallizer-evaporator is cooled to condense most of the water. Any SO$_2$ dissolved in the condensate is stripped out, recovered and mixed with the gaseous SO$_2$. This is part of the crystallizer-evaporator installation. The cool vapor mixture flows through piping (10) into SO$_2$ compressor (11). The compressed vapor is led into a heat exchanger not shown in which it is cooled to condense additional water. The condensate is returned to the SO$_2$ condensate stripper. The partially dried, compressed SO$_2$ flows by piping (12) to the sulfur formation reactor (42).

The slurry flowing through piping (8) entering Na$_2$SO$_3$ precipitator (9) is mixed with solid NaHCO$_3$ filter cake that is conveyed by conveyor belt (13) and NaHCO$_3$ solution which flows into Na$_2$SO$_3$ precipitator (9) by means of piping (14).

Na$_2$SO$_3$ precipitator (9) is a closed, agitator-equipped reactor with a gas outlet to which piping (15) is connected that leads to CO$_2$ compressor (16).

The amount of slurry, solid NaHCO$_3$ filter cake and NaHCO$_3$ solutio entering Na$_2$SO$_3$ precipitator (9) is so proportioned that the Na$_2$S$_2$O$_5$ entering Na$_2$SO$_3$ precipitator (9) is converted to Na$_2$SO$_3$ and CO$_2$ as shown in Reaction C. Enough water is also added so that the number of moles of solid, crystalline Na$_2$$_{SO3}$ in the reaction mixture is substantially equal to two-thirds of the number of moles of SO$_2$ which had been absorbed from the flue gas. The other third had previously been vaporized and recovered in the crystallizer-evaporator installation (7).

The slurry formed in the Na$_2$SO$_3$ precipitator (9) flows through piping (17) to solids-liquid separation in the form of filter (18). The filtrate enters absorption tower feed tank (4) by way of piping (19). It has substantially the composition of the original saturated Na$_2$SO$_3$ solution which was previously fed to absorption tower (1). By this series of reactions the original absorbent liquid is regenerated.

The Na$_2$SO$_3$ filter cake leaves filter (18) by means of conveyor (20). It is intimately blended with a finely grounded reducing agent usually bituminous coal in mixer (21). The reducing agent is fed by conveyor (22) which connects the reducing agent silo, not shown, with mixer (21). The intimate mixture formed in mixer (21) is transported by conveyor (23) to agglomerator (24) which may be a compactor, pellet mill or briquettor. The agglomerate is fed by weight belt (25) to reducing kiln (26). The reducing kiln may be any suitable reactor in which the agglomerate can be heated in a reducing atmosphere to a temperature above about 700° C. for a sufficiently long time to substantially complete Reaction D.

The overall reaction which takes place is represented by Reaction D. In actuality, Na$_2$SO$_3$ disproportionates at temperatures close to 600° C.:

$$4Na_2SO_3 = 3Na_2SO_4 + Na_2S$$

Consequently, the reduction that takes place is the reduction of Na$_2$SO$_4$ to form Na$_2$S. Na$_2$SO$_4$ is reduced at elevated temperatures by hydrogen, coke, carbon monoxide and hydrocarbons. At large coal burning power plants, the least expensive reducing agent will generally be bituminous coal. Bituminous coal is a satisfactory reducing agent for Na$_2$SO$_3$. To insure maximum reduction, it is assumed that carbon monoxide forms rather than carbon dioxide. The actual optimum ratio of reducing agent to Na$_2$SO$_3$ varies with the equipment employees. For example, if the reaction mixture is heated indirectly, less reducing agent will be needed than is required when the necessary heat is generated within the kiln by the controlled addition of air. The manner in which Na$_2$S is obtained from Na$_2$SO$_3$ is not critical. That most of the Na$_2$SO$_3$ fed to the reducing step is converted to Na$_2$S is critical.

The heat in the combustibles in the hot gas leaving the reduction step can be recovered by feeding it to waste heat boiler (27). To minimize air pollution, it is useful to mix the exit gas from the waste heat boiler with the flue gas leaving the power plants economizer. The flue gas flows through duct (28) which connects with duct (1).

The product leaving the reduction step consists primarily of Na$_2$S and the ash components in the reducing agent. The material leaving reducer (26) is moved to Na$_2$S dissolver (29) by conveyor (30). Enough water is fed to the Na$_2$S dissolving step by means of line (31) to form about a 35% solution. This concentration is not critical. Any convenient concentration can be used. It is desirable to use an amount of water so that the overall water balance of the process is controlled with little or no expense.

A slurry is formed in the dissolver. The ash is suspended in the Na$_2$S solution. The slurry is fed by piping (32) to solids-liquid separation in the form of a filter (33) or any equivalent type of equipment. The filter cake is discarded. The filtrate is piped to the carbonation feed tank, not shown, in which its temperature is adjusted to about 45° C. The solution is then fed by piping (34) to an upper liquid inlet of carbonation tower (35). The other solution fed to the carbonation tower is a saturated NaHCO$_3$ solution It flows into the carbonation tower from piping (36) connected to a second upper liquid inlet of the carbonation tower. Gaseous compressed CO$_2$ is also fed to the carbonation tower by means of piping (37) which connects CO$_2$ compressor (16) with the carbonation tower's lower gaseous inlet.

The pressure at which the carbonation tower operates is not critical. Very often the optimum economic pressure will be in the range of 20 to 50 pounds per square inch. Reaction F takes place within the carbonation tower. The gaseous product is H$_2$S which leaves the tower by means of H$_2$S outlet piping (38). A slurry of solid NaHCO$_3$ suspended in a saturated solution of NaHCO$_3$ is formed in carbonation tower (35). It flow out of the tower's bottom outlet and through piping (39) to solids-liquid separation in the form of a filter or centrifuge (40). The separated solid NaHCO$_3$ is transported by conveyor (13) to Na$_2$SO$_3$ precipitator (9). The filtrate passes into the filtrate receiver not shown. Piping (41) connects the filtrate receiver to piping (14) and (36).

The H$_2$S leaving carbonation tower (35) is fed to the sulfur production step by a continuation of piping (38). SO$_2$ leaving compressor (11) flows through piping (12) to the sulfur production unit (42).

Reaction H takes place in the sulfur production unit. Both the SO$_2$ and H$_2$S feeds contain some water vapor. The H$_2$S feed may contain a small percentage of CO$_2$ should a slight excess be fed to the carbonation column. Neither feed contains more than a slight amount of air and this only when air enters the system.

The sulfur production reaction can be carried out in several different ways. The preferred method is to employ a modified Claus process installation. In such an installation the feed components in substantially stoichiometric porportions, but with a small excess of H$_2$S, is passed over two or three sets of alumina catalyst beds, condensers and reheaters. The catalysts are active over a wide temperature range. In the practical absence of inert gas but in the presence of water vapor, the catalyst is maintained at a temperature such that the sulfur stays in the vapor phase until it reaches the condenser heat exchange surface. The temperature within the condenser is controlled to condense sulfur within the temperature range at which its viscosity is low. The final product of the operation is liquid sulfur. Steam traced line (43) connects the sulfur production reactor to liquid sulfur storage not shown. The gas leaving the sulfur production reactor is cooled to condense some of the water vapor and the excess H$_2$S recycled to the inlet of the sulfur production reactor. This recycle is not shown.

From the above description it will be evident that it is possible to operate a process in which SO$_2$ is absorbed by a saturated Na$_2$SO$_3$ solution in the manner described above and, omitting the partial SO$_2$ desorption step, the resulting solution can be processed to recover a concentrated H$_2$S gas stream which can subsequently be converted to sulfur. The partial SO$_2$ desorption step requires considerable equipment made of corrosion resistant alloys as well as an appreciable consumption of steam. While these expense items are not insignificant, they are very much less than the savings obtained by employing the SO$_2$ partial desorption step. At the cost of including the SO$_2$ partial desorption step, the required capacity of all of the other needed equipment, other than the SO$_2$ absorption towers, is cut by one third. The resultant investment saving is appreciably greater than the cost of the equipment needed to carry out the SO$_2$ partial desorption step.

There is also a saving of one-third of the cost of the reducing agent. As has been mentioned above, steam is generated from the energy contained in the gas leaving the reducing kiln. The sulfur formation reaction is exothermic. Steam can be recovered from the modified Claus process installation. These two sources of steam supply a large fraction of the steam needed to liberate the SO$_2$ in the SO$_2$ partial desorption step. Overall, there is a net saving in energy using the partial SO$_2$ desorption step.

Substantial energy is required to circulate solutions and solids around the process and to carry out the solid-liquid separation steps. The use of the SO$_2$ partial liberation enables one-third of this energy to be saved.

The compression of the SO$_2$ so that it will flow through the modified Claus process unit requires a substantial energy expenditure. More than twice this amount of energy is saved because only two-thirds of the amount of CO$_2$ is circulated through the process when the SO$_2$ partial desorption step is employed. For every mole of SO$_2$ compressed, two moles of CO$_2$ do not have to be compressed. In addition, the CO$_2$ is compressed to a substantially larger pressure than the SO$_2$ since the CO$_2$ is fed to the carbonation tower which operates above the pressure of the modified Claus process unit. The compression of the CO$_2$ also supplies the energy needed to have the H$_2$S flow through the Claus process unit.

The capital investment and operating cost of a typical Claus process unit is a function of the gas volume which must be handled for any specific sulfur production capacity. Even when the feed is 100% H$_2$S and the process operates perfectly, the exit gas will constitute a large fraction of the gas fed to the unit and the exit gas will be the nitrogen introduced with the air. There is no need for air when the feed consists only of H$_2$S and SO$_2$ in a mole ratio of two (2) to one (1).

The degree to which the Claus reaction goes to completion is determined by its equilibrium characteristics. In many instances the reaction reaches equilibrium when it has gone to about 75% completion in the first reaction stage. To cause it to go further, the reaction mixture is cooled to condense liquid sulfur which is separated from the remaining gas mixture. The mixture is reheated, passed over a second catalyst bed, and into a second sulfur condenser in which the newly formed sulfur is condensed. In this condenser about 15% of the initial sulfur entering the unit is recovered. The cycle is often repeated again and sometimes a fourth time before the tail gas is further processed to avoid infringing air pollution regulations. This is the typical operation of a Claus process unit.

This invention makes it economically possible to feed the sulfur production step with a gas mixture containing substantially only $H_2S$ and $SO_2$ in a mole ratio of two (2) to one (1). As a result, the sulfur production unit need consist of only one sizable catalyst bed, and appropriate heat exchangers and condensers by adding a recycle blower to the installation. The flow scheme then consists of initially preheating the $H_2S$-$SO_2$ gas mixture and passing it over the catalyst bed. The resultant reaction mixture is cooled to condense and separate the sulfur formed in the reaction. The substantially sulfur-free gas is further cooled to condense and separate water. The remaining approximate 25% of the initial gas is reheated and recycled to the catalyst along with the fresh feed. By this device all of the sulfur is recovered and the catalyst has an overall conversion efficiency of about 75% rather than the much lower conversion efficiency of the usual Claus process unit. In addition to the savings in catalyst reactors there are worthwhile savings in heat exchangers and condensers; all made possible by the use of the novel features of this invention.

The concept of absorbing $SO_2$ in an aqueous solution and then separating all of the absorbed $SO_2$ while simultaneously regenerating the absorbent is well known and has been widely practiced. While eminently technically feasible, such a process has two substantial disadvantages. The first is the large required investment and large operating cost of the regeneration step. The second disadvantage is that there is a very small market for the separated $SO_2$. As a result, the separated $SO_2$ must be converted to some other product. The preferred product is elemental sulfur. To reduce gaseous $SO_2$ to elemental sulfur takes a sophisticated complex plant whose first cost and operating cost are large.

In the above description it will be noted that the separated $SO_2$ is obtained by vaporizing $SO_2$ and water with the expenditure of steam. A relatively large amount of steam is required since in this process about seven to eight parts of water have to be vaporized for every part of $SO_2$ separated. Larger amounts of water must be vaporized per part of $SO_2$ vaporized when all of the absorbed $SO_2$ must be vaporized. As stated above, a similar operation can be carried out using mechanical vapor recompression to vaporize water and $SO_2$. The bulk of the energy expended when using this $SO_2$ separation scheme is generally electricity supplied to an electric motor that drives the compressor.

Another method of using electricity to separate $SO_2$ from flue gas and recovering concentrated sulfur dioxide consists of scrubbing the flue gas with an aqueous solution containing sodium hydroxide to form a sodium bisulfite solution. This solution is acidified with an acidic sulfate solution to form sulfurous acid and sodium sulfate. The sulfurous acid solution is heated to drive off concentrated $SO_2$. The sodium sulfate solution is electrolyzed in a diaphragm cell to form an acid sulfate solution and a sodium hydroxide-containing solution. The alkaline solution is recycled to the flue gas scrubbing step and the acid sulfate sodium recycled to the sulfurous acid formation step. While feasible this process requires a large investment in electrolytic cells and consumes a large amount of electric power per pound of concentrated $SO_2$ recovered. It also has the disadvantage of obtaining concentrated $SO_2$ as the final product.

A similar process employs electrodialysis rather than electrolysis. Electrodialysis employs a bipolar membrane to split water into hydrogen ion and hydroxyl ion. The electrodialysis process has two substantial advantages compared with the electrolysis process: less electric power is consumed, and the required investment in electrolytes cells is less. U.S. Pat. No. 4,107,015 issued Aug. 15, 1978 describes the application of electrodialytic water splitting to sulfur dioxide removal from a gas stream and the recovery of the $SO_2$ as a concentrated gas. This process possesses the same disadvantages as other processes in which a large investment is required for the equipment in which all of the absorbed $SO_2$ is recovered as a concentrated gas coupled with the expenditure of the electrical and thermal energy that is required to both separate the $SO_2$ from the absorbent and regenerate the absorbent.

The electrodialytic water splitting process is described in U.S. Pat. No. 4,107,015. Electrodialytic water splitting in which hydrogen ions and hydroxyl ions are obtained can be usefully employed to obtain elemental sulfur from sulfur dioxide initially present as a minor component of a gas mixture when it is one of a number of operations carried out in a unique sequence. This unique sequence can be understood by referring to FIG. 2 along with the following description.

The $SO_2$-containing gas flowing in duct (101) enters a lower gas inlet in gas-liquid contactor (102). This contactor is preferably a vertical tower in which the gas inlet is located close to the bottom. An aqueous $SO_2$ absorbent flowing in piping (103) enters the tower through a top liquid inlet. Counter-current contacting takes place within the tower between the upward flowing gas and the falling aqueous $SO_2$ absorbent. The gas reaching the top of the vertical tower is vented to the atmosphere by means of duct (105).

The $SO_2$ absorbent in this version of this invention is a substantially saturated $Na_2SO_3$ solution. As the absorbent travels from the upper part of the tower to the bottom liquid outlet, $SO_2$ is absorbed. The absorbed $SO_2$ reacts with the $Na_2SO_3$ to form an aqueous sodium bisulfite-containing solution or, its equivalent, a sodium pyrosulfite ($Na_2S_2O_5$)-containing solution. In essence, Reactions A-1 or A-2 take place. For reasons which will be clear from what follows, the $SO_2$ absorbent must be substantially saturated. The degree to which the $Na_2SO_3$ is converted to $NaHSO_3$ is determined by th adequacy of the gas-liquid contacting within the tower, the $SO_2$ content of the entering gas and the ratio of $Na_2SO_3$ and $SO_2$ brought into contact. If necessary, part of the solution leaving the tower's bottom liquid outlet can be recycled to a second liquid inlet in the tower not shown by piping and pumps not shown. This is a well known means for increasing the liquid-gas ratio so that the liquid leaving the tower is in substantial equilibrium with the incoming gas. In general, 80% or more of the $Na_2SO_3$ is converted to $NaHSO_3$.

Figure 2:
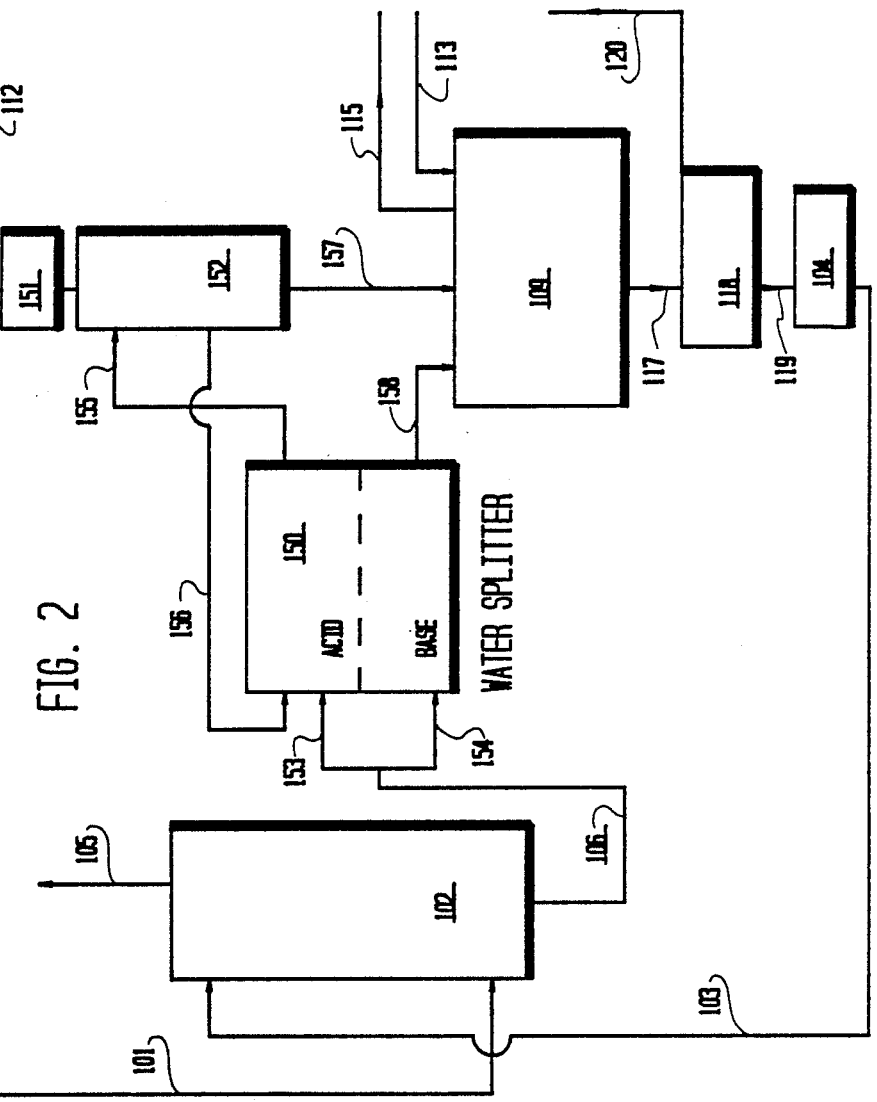
FIG. 2 is another version of the invention in which $SO_2$ is liberated from $NaHSO_3$ by the acidic reaction shown as B-3. Simultaneously, an equivalent amount of $Na_2SO_3$ is formed as shown in Reaction B-4. Undesirable Reaction B-5 also takes place in this version of the process. The sodium ion which migrates as a result of Reaction B-5 also forms $Na_2SO_3$ from $NaHSO_3$ and hydroxyl ion.

In this embodiment the solution leaving the $SO_2$ absorber flowing through line (106) is divided into two fractions. One fraction is preferably about one-third of the absorber product and the remainder about two-thirds of the absorber product. The one-third fraction is the feed to the acid side of a water splitter (150). It is shown in FIG. 2 passing through line (153). The two thirds fraction is the feed to the basic side of the water splitter (150). It is shown passing through line (154).

The acidulated solution leaving the acid side of the water splitter (150) flow through line (155) into $SO_2$ separator (152).

In the acid side of the water splitter (150) Reactions B-3 and B-5 take place. In the basic side of the water splitter (150), Reaction B-4 occurs.

When hydrogen ion migrates into the acid side of the water splitter it reacts with any $Na_2SO_3$ present to form $NaHSO_3$ before it can react with any $NaHSO_3$ to form sulfurous acid. Consequently, any $Na_2SO_3$ flowing into the acid side of the water splitter causes the process to be less efficient. By minimizing the $Na_2SO_3$ content in the absorber product, this source of inefficiency is minimized.

$SO_2$ stripper (152) is essentially a distillation column. The solubility of $SO_2$ in an acidic solution is small and diminishes at elevated temperatures. By connecting a vacuum source such as a vacuum pump (151) to the gaseous top outlet of stripper (152) most of the $SO_2$ contained in the solution entering the stripper is vaporized. To insure that excess pressure is not created by the $SO_2$ formed in the acid side of the water splitter (150), the flow of solution through the water splitter is correlated with the current flow. By this means the dissolved $SO_2$ content of the outflowing solution is controlled to prevent the pressure exceeding some predetermined level. To achieve this condition usually the rate at which solution passes through the acid side of the water splitter must be in excess of what the rate would be if solution from the absorber made only one pass through the acid side of the water splitter. The $SO_2$ pressure can be controlled by separating in the $SO_2$ separator (152) most of the $SO_2$ dissolved in the solution leaving the acid side of the water splitter. An appropriate fraction of the largely $SO_2$ denuded solution is recycled to the acid side of the water stripper; this solution flows out of an upper liquid outlet in the $SO_2$ separator (152) through line (156) to the acid side of the water splitter. It is desirable to have the $SO_2$ contained in the recycled solution be just sufficient to convert to $NaHSO_3$ the $Na_2SO_3$ contained in the fresh feed. Heat is supplied by means not shown to the solution just before it leaves through the lower liquid outlet of $SO_2$ separator (152). This causes the outgoing solution to be substantially free from dissolved $SO_2$.

The solution leaving through the lower liquid outlet of $SO_2$ separator (152) consists essentially of $NaHSO_3$ and water. A small amount of $Na_2SO_4$ will also be present as a result of some slight oxidation of $Na_2SO_3$ in the $SO_2$ absorber. However, as will be evident later, there is no $Na_2SO_4$ build up in the system. The $NaHSO_3$ content of the solution is just about half of the $NaHSO_3$ content of the feed solution. By maitaining a sodium bisulfite concentration at this approximate level, the solution remains highly conductive so that the cell voltage stays low. As indicated in FIG. 2, the $NaHSO_3$ solution flows into the reactor (109) through line (157). The solution leaving the basic side of the water splitter also flows into reactor (109) through line (158). The other feed (113) to reactor (109) is $NaHCO_3$ filter cake. Reactor (109) is an agitator-equipped closed vessel with a top gaseous outlet and a bottom slurry outlet.

The amount of $NaHCO_3$ filter cake added to reactor (109) is equivalent to th amount of $NaHSO_3$ contained in the solution coming from feed lines (157) and (158). The $NaHCO_3$ and $NaHSO_3$ react to form $H_2O$, $CO_2$ $Na_2SO_3$ as shown in Reaction C. Because the absorbent solution fed to absorption tower (102) is a substantially saturated $Na_2SO_3$ solution, the quantity of solid $Na_2SO_3$ that crystallizes and comes out of solution is equivalent to two-thirds of the $SO_2$ absorbed in absorber (102). A mole of gaseous $CO_2$ forms for each mole of $NaHCO_3$ fed to reactor (109). It leaves the reactor and flows through line (115) to a compressor.

The slurry formed in reactor (109) flows through a bottom outlet by way of line (117) to solids-liquid separator (118). The separated liquid flows into absorber feed tank (104) by means of line (119). The liquid is a substantially saturated $Na_2SO_3$ solution. It is recycled to $SO_2$ absorber (102) by means of line (103).

The separated solid $Na_2SO_3$ is conveyed by means of belt conveyor (120) to the reduction step of the process as previously described. The remaining steps of the process are also carried out as described above.

The separated solid $Na_2SO_3$ is conveyed by means of belt conveyor (120) to the reduction step of the process as previously described. The remaining steps of the process are also carried out as described above.

It is now possible to show the differences between the process described in U.S. Pat. No. 4,107,015 and the advantages of the present invention. Only about one half of the $NaHSO_3$ fed to the acid side of the water splitter is reacted with hydrogen ion to form $SO_2$. The remainder as explained above, is used to maintain the conductivity of the solution on the acid side of the water splitter. In U.S. Pat. No. 4,107,015 an appreciable amount of $Na_2SO_4$ must be continuously circulated throughout the system. In the present invention the crystalline $Na_2SO_3$ which comes out of solution is a mixed crystal of $Na_2SO_4$ and $Na_2SO_3$. Because of this happening, the sulfate content of the circulating solution automatically remains at a low level. In addition, the sulfur in the sulfate formed is eventually recovered as elemental sulfur. No additional facilitates are needed to rid the system of sulfate. The process of U.S. Pat. No. 4,107,015 possesses neither of these substantial advantages.

It has been stated above that a costly, perhaps the most costly, part of those regenerable flue gas desulfurization processes in which all of the absorbed $SO_2$ is recovered as concentrated $SO_2$ is the absorbent regeneration step. In the present invention two-thirds of this cost is saved. This saving is obtained because only one-third of the absorbed $SO_2$ is recovered as concentrated $SO_2$ along with the regeneration of one third of the absorbent. By employing the reduction step as described and integrating it with the other steps of the process, the other two-thirds of the absorbent are regenerated by a number of simple chemical reactions combined with several physical inexpensive separations.

An essential step of this process is the reduction of $Na_2SO_3$ to $Na_2S$. When this operation is carried out, it not only enables the economical conversion and recovery of sulfur to be achieved, it also provides an economical route for the regeneration of two-thirds of the absorbent.

It is obvious that to absorb $SO_2$ whose solution is acidic, an alkaline absorbent is necessary. Such an absorbent is $Na_2SO_3$. A pure solution of $Na_2SO_3$ has a pH of almost 10, appreciably above the pH required to substantially quantitatively react with $SO_2$ to form $Na_2SO_3$.

When $Na_2SO_3$ is reduced to $Na_2S$ and the $Na_2S$ dissolved in water, a very alkaline solution is formed. As is known, $Na_2S$ is a more alkaline material than $Na_2CO_3$. Consequently, the reduction of $Na_2SO_3$ to $Na_2S$ is the equivalent of regeneration an alkaline absorbent. By using $CO_2$ as a cyclic reagent in the manner described, the alkalinity of the $Na_2S$ is partially diminished as $H_2S$ is liberated and $NaHCO_3$ is formed. $NaHCO_3$ is a slightly alkaline material. Then, by reacting acidic $NaHSO_3$ with $NaHCO_3$ under readily attainable conditions as described above, $Na_2SO_3$ is regenerated. When pure, it forms a more alkaline solution than $NaHCO_3$. Fundamentally, the reduction of $SO_2$ to sulfur is accomplished by initially reducing two-thirds of the $SO_2$ to $H_2S$ and then using the $H_2S$ to reduce the remaining one-third to sulfur while simultaneously oxidizing the $H_2S$ sulfur. As a result, at the cost of reducing $SO_2$ to sulfur, two-thirds of the absorbent is regenerated at very little cost. In addition, by employing the route described as part of this invention, the sulfur is produced in the substantial absence of fixed gases such as nitrogen or undesirable gases such as carbon dioxide. This makes possible the recovery of elemental sulfur simply in relatively inexpensive equipment.

While the use of the $SO_2$ partial desorption step causes the process constituting this invention to be somewhat more complex than other regenerable flue gas desulfurization processes, the various benefits which are obtained are so substantial that the resultant process is a marked advance in this technological area. Variations may be usd in each of the steps without deviating from the invention as defined by the following claims:

What is claimed is:

1. A regenerable process for recovery of elemental sulfur from a gas containing sulfur dioxide comprising the steps of:
    (a) contacting said gas with an aqueous, alkaline reaction medium containing sodium sulfite in concentration sufficient so that a slurry containing solid sodium sulfite is formed in step (c), to react sulfur dioxide with sodium sulfite to form a solution containing dissolved sodium pyrosulfite and sodium sulfite;
    (b) separating sulfur dioxide from the solution produced in step (a) to leave a residual mixture containing water, sodium sulfite and a sodium pyrosulfite, the amount of sulfur dioxide separated being equal to about one-third the amount of sulfur dioxide which reacted with sodium sulfite in step (a);
    (c) adding, in substantial absence of air, sufficient water and sodium bicarbonate to the residual mixture formed in step (b) to react with the dissolved sodium pyrsulfite and form a slurry of solid sodium sulfite suspended in the resulting aqueous, alkaline reaction medium and gaseous carbon dioxide;
    (d) separating the gaseous carbon dioxide formed in step (c);
    (e) separating the solid sodium sulfite from the acqueous, alkaline reaction medium and recycling said separated reaction medium to step (a);
    (f) reducing the separated sodium sulfite to sodium sulfide;
    (g) adding the sodium sulfide formed in step (f) to an aqueous reaction medium containing sodium bicarbonate and, in the substantial absence of air, carbonating the resulting mixture with the gaseous carbon dioxide formed in step (c) to form a slurry of solid particles of sodium bicarbonate dispersed in an aqueous reactor medium containing sodium bicarbonate, along with a gas composed primarily of hydrogen sulfide;
    (h) recovering the hydrogen sulfide formed in step (g) and reacting it with the sulfur dioxide separated in step (b) to form elemental sulfur, to be recovered, and water;
    (i) separating from the slurry formed in step (g) an amount of the reaction medium containing sodium bicarbonate equal to the amount added to sodium sulfide in step (g) and recycling said separating reaction medium to step (g); and
    (j) recycling to step (c) the sodium bicarbonate formed in step (g).

2. The process of claim 1 in which step (b) comprises heating the solution formed in step (a) to vaporize sulfur dioxide and water and leave a residual mixture containing water, sodium sulfite and sodium pyrosulfite; and separating the vaporized sulfur dioxide from the bulk of the vaporized water.

3. The process of claim 1 in which an electrodialytic water splitter, having acid and basic compartments, is employed and step (b) comprises passing about one-third of the solution formed in step (a) into the acid compartments, and the remainder of the solution into the alkaline compartments; passing direct current through said water splitter to form dissolved sulfur dioxide in the solution passing through the acid compartments, and sodium sulfite in the solution passing through the alkaline compartments; vaporizing and recovering sulfur dioxide from the solution contained in the solution leaving said acid compartments; mixing the solution leaving said alkaline compartments with the solution from which the sulfur dioxide was recovered to form a residual mixture containing water, sodium sulfite and sodium pyrosulfite; the direct current flow through said water splitter being sufficient that the amount of sulfur dioxide recovered is substantially equal to one-third of the amount of sulfur dioxide which reacted with sodium sulfite in step (a).

4. The process of claim 1 in which step (a) is carried out above a temperature of about 35° C. (95° F.).

5. The process of claim 1 in which the reducing agent used in step (f) is an ash-containing solid.

6. The process of claim 5 in which the sodium sulfide formed in step (f) is dissolved in a water-containing reaction medium to form a slurry of an aqueous sodium sulfide-containing reaction medium in which ash particles are suspended, separating the ash particles from the sodium sulfide-containing reaction medium and feeding the separated sodium sulfide-containing reaction medium to step (g).

7. The process of claim 1 in which step (g) is carried out at a pressure in the range of two (2) to four (4) atmospheres.

8. The process of claim 1 in which step (h) is carried out in the substantial absence of an inert gas.

* * * * *

UNITED STATES PATENT AND TRADEMARK OFFICE
CERTIFICATE OF CORRECTION

PATENT NO. : 4,837,001
DATED : June 6, 1989
INVENTOR(S) : Ralph Miller

It is certified that error appears in the above-identified patent and that said Letters Patent is hereby corrected as shown below:

Col. 3, line 49 : "solids" should be --solid--

Col. 3, line 68 : "$H_2$" should be --$H_2S$--

Col. 4, line 19 : "$H+$" should be --$H^+$--

Col. 4, line 31 : "drawings" should be --drawing--

Col. 5, line 51 : "$Na_2SO_5$" should be --$Na_2S_2O_5$--

Col. 6, line 9 : "$Na_2SO_3$" should be --$Na_2SO_3$--

Col. 7, line 65 : "production" should be --formation--

Col. 11, line 67: before "$Na_2SO_3$" insert --and--

Col. 14, line 14: "separating" should be --separated--

Signed and Sealed this

Twentieth Day of February, 1990

Attest:

JEFFREY M. SAMUELS

Attesting Officer        Acting Commissioner of Patents and Trademarks